Adams et al.

[11] 3,726,584
[45] Apr. 10, 1973

[54] LIGHT MODULATION SYSTEM
[75] Inventors: James E. Adams, Ontario; Werner E. L. Haas, Webster, both of N.Y.
[73] Assignee: Xerox Corporation, Stamford, Conn.
[22] Filed: May 28, 1971
[21] Appl. No.: 147,915

[52] U.S. Cl. ............. 350/150, 350/147, 350/160 LC
[51] Int. Cl. ................................................. G02f 1/26
[58] Field of Search ..................... 350/147, 150, 157, 350/160, DIG. 2

[56] References Cited

UNITED STATES PATENTS

| | | | |
|---|---|---|---|
| 3,114,836 | 12/1963 | Fergason et al. | 350/160 |
| 3,627,408 | 12/1971 | Fergason | 350/160 |
| 3,576,364 | 4/1971 | Zanoni | 350/157 |
| 3,401,262 | 9/1968 | Fergason et al. | 350/160 |

OTHER PUBLICATIONS

Adams et al., "Optical Properties of Certain Cholesteric Liquid Crystal Films" J. Chem. Phys. Vol. 50, No. 6 (15 Mar 1969) pp. 2458–2464

Haas et al., "Electrophotographic Imaging with Cholesteric Liquid Crystals" App. Opt. Vol. 7, No. 6 (June 1968) pp. 1203–1206

Margerum et al., "Reversible Ultraviolet Imaging with Liquid Crystals" App. Phys. Lett. Vol. 17, No. 2 (15 July 1970) pp. 51–53

Haas et al., "Imagewise Deformation and Color Change of Liquid Crystals in Electric Fields" App. Opt. Supp. on Electrophotography (1969) pp. 196–198.

*Primary Examiner*—David Schonberg
*Assistant Examiner*—Paul R. Miller
*Attorney*—James J. Ralabate

[57] ABSTRACT

A system for modulating light is disclosed comprising directing a beam of linearly polarized monochromatic light on an optically negative liquid crystal film and subsequently varying the pitch of the liquid crystal film in response to some stimulus to which the pitch of the film is sensitive. Specific applications in which the system can be utilized are also described.

18 Claims, 6 Drawing Figures

INVENTORS
JAMES E. ADAMS
WERNER E. L. HAAS

LIGHT MODULATION SYSTEM

BACKGROUND OF THE INVENTION

This invention relates generally to a system for modulating a monochromatic beam of light and more particularly to such a system which employs optically negative liquid crystalline substances.

Liquid crystalline substances exhibit physical characteristics some of which are typically associated with liquids and others which are typically unique to solid crystals. The name "liquid crystals" has become generic to substances exhibiting these dual properties. Liquid crystals are known to appear in three different forms: the smectic, nematic and cholesteric forms. These structural forms are sometimes referred to as mesophases thereby indicating that they are states of matter intermediate between the liquid and crystalline states. The three mesophase forms of liquid crystals mentioned above are characterized by different physical structures wherein the molecules of the compound are arranged in a molecular structure which is unique to each of the three mesomorphic structures. Each of these structures is well known in the liquid crystal art.

Liquid crystals have been found to be sensitive or responsive to temperature, pressure, shear, foreign chemical compounds and to electric and magnetic fields, as disclosed in copending applications Ser. No. 646,532, filed June 16, 1967, Ser. No. 646,533, filed June 16, 1967 and now abandoned, Fergason et al. U.S. Pat. No. 3,114,838, French Pat. No. 1,484,584, and Fergason U.S. Pat. No. 3,409,404. Liquid crystals have also been found to be useful in imaging systems such as are described in copending applications Ser. No. 821,565, filed May 5, 1969 now U.S. Pat. No. 3,652,148 and Ser. No. 867,593, filed Oct. 20, 1969 now U.S. Pat. No. 3,642,348.

In particular, liquid crystalline substances having optically negative characteristics have been found to possess unique optical acticity which makes such substances extremely useful in optical filter devices. Optical filter systems employing such liquid crystalline substances have been disclosed and claimed in copending applications, Ser. No. 104,367, filed Jan. 6, 1971 now U.S. Pat. No. 3,669,525 and Ser. No. 104,369, filed Jan. 6, 1971 now U.S. Pat. No. 3,679,290.

In growing areas of technology such as liquid crystals, new methods, apparatus, compositions and articles of manufacture are often discovered for the application of the new technology in a new mode. The present invention relates to a novel and advantageous system for modulating an incident plane polarized or unpolarized beam of monochromatic light utilizing liquid crystalline substances.

SUMMARY OF THE INVENTION

It is, therefore, an object of this invention to provide a system for modulating a monochromatic beam of light.

It is another object of the invention to provide a system for modulating a monochromatic beam of light which utilizes liquid crystal substances having optically negative properties.

It is still another object of the invention to provide a system for modulating a monochromatic beam of light which utilizes cholesteric liquid crystal substances.

It is a further object of the invention to provide a system for modulating a monochromatic beam of light by varying the pitch of a liquid crystal substance having optically negative properties in response to some stimulus to which the pitch of said substance is sensitive.

It is still a further object of the invention to provide an inexpensive system for modulating a monochromatic beam of light.

Yet another object of the invention is to provide an extremely sensitive method for detecting changes in temperature.

A further object of the invention is to provide an imaging method.

Still another object of the invention is to provide an apparatus suitable for modulating an incident beam of monochromatic light.

Yet still another object of the invention is to provide an apparatus suitable for modulating a monochromatic beam of light which utilizes a thin film of a liquid crystalline substance having optically negative properties.

Another object of the invention is to provide an extremely sensitive apparatus for detecting changes in temperature.

These and other objects and advantages are accomplished in accordance with the invention by utilizing the optical activity characteristics of liquid crystalline substances having optically negative characteristics. Birefringence, also referred to as double refraction, is an optical phenomenon characteristic of some solid crystals and most liquid crystal substances. When a beam of unpolarized light strikes a birefringent substance, it is split into two polarized components whose transverse vibrations are at right angles to each other. The two components are transmitted at different velocities through the substance and emerge as beams of polarized light. By the term "liquid crystalline substance which has optically negative properties" as used herein is meant one for which the extraordinary index of refraction $n_E$ is smaller than the ordinary index of refraction $n_O$. For a detailed description of this phenomenon see *Optical Crystallography*, Wahlstrom, 4th Edition, Wiley and Sons, New York.

Cholesteric liquid crystal substances exhibit optically negative characteristics. The molecules in cholesteric liquid crystals are arranged in very thin layers with the long axes of the molecules parallel to each other and to the plane of the layers within each layer. Because of this configuration of the molecules, the direction of the long axes of the molecules in each layer is displaced slightly from the corresponding direction in adjacent layers. This displacement is cumulative over successive layers so that overall displacement traces out a helical path. A comprehensive description of the structure of cholesteric liquid crystals is given in *Molecular Structure and the Properties of Liquid Crystals*, G. W. Gray, Academic Press, 1962.

Optically negative liquid crystalline substances possess anomalously high optical activity which changes sign at some critical wavelength $\lambda_o$ where $\lambda_o = 2\,np$ with n representing the index of refraction of the liquid crystal substance and p the pitch or repetition distance of the helical structure of the liquid crystal material. Thin films of optically negative liquid crystal substances, i.e., from about 0.5 to about 50 microns in thickness rotate the plane of polarization of linearly polarized light by substantial amounts depending upon both the wavelength of the incident light and the pitch of the liquid crystalline substance. The pitch of these optically negative liquid crystal materials can be varied by the presence of some stimulus to which their pitch is sensitive, e.g., electric fields, magnetic fields, foreign chemicals, shear, temperature, pressure, etc.. Thus varying the film pitch in response to some stimulus results in a change in the amount of rotation imparted to the incident light by the liquid crystal film.

The invention takes advantage of this phenomenon associated with optically negative liquid crystalline substances to provide an advantageous system for modulating a monochromatic light beam. According to the invention, a linearly polarized beam of monochromatic light is directed upon a thin film of an optically negative liquid crystalline substance and subsequently the pitch of the liquid crystal film is changed by applying thereto some stimulus to which the pitch of the film is sensitive. As the pitch of the liquid crystal film is changed, the degree of rotation imparted to the incident light beam is varied. According to a preferred embodiment of the invention a linear analyzer is positioned behind the liquid crystal film to detect the effect of the film upon the incident light beam. The invention is preferably practiced by initially rotating the axis of polarization of the linear analyzer to a position where the incident light beam is completely extinguished and subsequently maintaining the linear analyzer in this position so that when some stimulus acts upon the liquid crystalline substance and changes the pitch of the substance thereby causing the degree of rotation imparted to the incident light to be changed, some light will be observed emerging from the linear analyzer. Thus according to this preferred embodiment of the invention the presence of a stimulus or a change in the amount of the stimulus present is characterized by a change from a condition where no light is observed emerging from the linear analyzer to one where some light is seen.

By the term "monochromatic light" as it is used throughout the specification and in the claims is meant a relatively narrow wavelength band of up to about 400 angstroms and includes, but is not limited, to light of a single wavelength. Of course, as will be appreciated by those skilled in the art and as will become more readily apparent from the detailed description of the invention given below, the quality of this light modulation system is dependent upon the width of the wavelength band of the incident monochromatic light where all other variables are constant. As the wavelength band of the incident light becomes progressively larger the light modulation system, while providing highly acceptable results, nevertheless experiences some corresponding loss in quality.

The novel light modulation system of the invention can be employed in any situation where it is desired to modulate an incident monochromatic light beam. Since as has been discussed above, the pitch of optically negative liquid crystalline films can be varied in response to a number of stimuli, the system can be employed in a number of specific embodiments such as, for example, to indicate temperature changes, and to provide an imaging method as will be discussed hereinafter in detail. An important practical advantage of the system is that the liquid crystalline materials employed are not expensive and the devices constructed according to the invention are relatively inexpensive since there is relatively little difficulty involved in the manufacture thereof. A further advantage of the system is that the devices can be very small, i.e., in the order of a few millimeters in thickness, and can be completely encapsulated by protective material.

The invention will be more fully understood and appreciated by those skilled in the art from the following detailed description of various preferred embodiments thereof, particularly when read in conjunction with the accompanying drawings in which.

Figure 1:
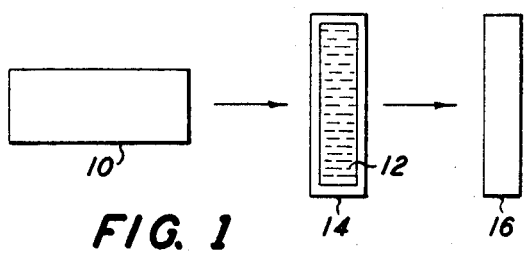
FIG. 1 is a schematic illustration of a typical device suitable for the practice of the light modulation system of the invention.

Referring now to FIG. 1 there is shown illustrated in a diagrammatic mode, a typical embodiment of the light modulation system of the invention. The spatial configuration of the elements of the system is for the purpose of illustration. There is seen a light source 10 capable of providing a linearly polarized monochromatic light beam, an optically negative liquid crystal film 12 surrounded by protective material 14 and a linearly polarized light analyzing element 16. The axis of polarization of the linear analyzer element 16 is preferably arranged in a position such that the incident light beam is substantially completely extinguished for the environmental conditions initially prevalent.

Any suitable cholesteric liquid crystalline material mixture or composition comprising cholesteric liquid crystals or composition having cholesteric liquid crystalline characteristics may be utilized for liquid crystal film 12. Typical suitable cholesteric liquid crystal substances include derivatives from reactions of cholesterol and inorganic acids, such as, for example: cholesteryl chloride, cholesteryl bromide, cholesteryl iodide, cholesteryl fluoride, cholesteryl nitrate; esters derived from reactions of cholesterol and carboxylic acids; for example, cholesteryl crotonate; cholesteryl nonanoate; cholesteryl hexanoate; cholesteryl formate; cholesteryl docosonoate; cholesteryl chloroformate; cholesteryl propionate; cholesteryl acetate; cholesteryl valerate; cholesteryl vaccenate; cholesteryl linolate; cholesteryl linoleate; cholesteryl oleate; cholesteryl erucate; cholesteryl butyrate; cholesteryl caproate;

cholesteryl laurate; cholesteryl myristate; cholesteryl clupanodonate; ethers of cholesterol such as cholesteryl decyl ether; cholesteryl lauryl ether; cholesteryl oleyl ether; cholesteryl dodecyl ether; carbamates and carbonates of cholesterol such as cholesteryl decyl carbonate; cholesteryl oleyl carbonate; cholesteryl methyl carbonate; cholesteryl ethyl carbonate; cholesteryl butyl carbonate; cholesteryl docosonyl carbonate; cholesteryl cetyl carbonate; cholesteryl-p-nonylphenyl carbonate; cholesteryl-2-(2-ethoxyethoxy) ethyl carbonate; cholesteryl-2-(2-butoxyethoxy) ethyl carbonate; cholesteryl-2-(2-methoxyethoxy) ethyl carbonate; cholesteryl geranyl carbonate; cholesteryl heptyl carbamate; and alkyl amides and aliphatic secondary amines derived from 3 $\beta$ -amino $\Delta$ 5-cholestene and mixtures thereof; peptides such as poly- $\gamma$ -benzyl- $l$ - glutamate; derivatives of beta sitosterol such as sitosteryl chloride; and amyl ester of of cyano benzylidene amino cinnamate. The alkyl groups in said compounds are typically saturated or unsaturated fatty acids, or alcohols, having less than about 25 carbon atoms, and unsaturated chains of less than about 5 double-bonded olefinic groups. Aryl groups in the above compounds typically comprise simply substituted benzene ring compounds. Any of the above compounds and mixtures thereof may be suitable for cholesteric liquid crystalline materials in the advantageous system of the present invention.

Compositions containing cholesteric liquid crystals and nematic liquid crystalline substances may also be utilized as the liquid crystal films of the light modulation system; and it has been found that such compositions may contain up to 98 percent by weight of the nematic component yet continue to function in accordance with the invention. Nematic liquid crystalline materials suitable for use in combination with cholesteric liquid crystalline materials in the advantageous system of the present invention include: p-azoxyanisole, p-ozoxyanisole, p-azoxyphenetole, p-butoxybenzoic acid, p-methoxy-cinnaminic acid, butyl-p-anisylidene-p'-aminocinnamate, anisylidene para-amino-phenylacetate, p-ethoxy-benzylamino-a-methyl-cinnamic acid, 1,4-bis (p-ethoxy benzylidene) cyclo hexanone, 4,4'-dihexyloxybenzene, 4,4'-diheptyloxybenzene, anisal-p-amino-azobenzene, anisaldazine, a-benzeneazo-(anisal- $\alpha$'-naphthylamine), anisylidene-p-n-butylaniline, n,n'-nonoxybenzyl-toluidine, mixtures of the above and many others.

Compositions suitable for use as liquid crystal films of the novel light modulation system may also comprise mixtures of cholesteric liquid crystals and suitable smectic liquid crystalline substances as well as mixtures of cholesteric liquid crystals and suitable non-liquid crystalline substances which are compatible with the cholesteric liquid crystal component. Typical suitable non-liquid crystalline materials include cholesterol, lecithin and the like. Typical suitable smectic liquid crystal substances include n-propyl-4'-ethoxy biphenyl-4-carboxylate; 5-chloro-6-n-heptyloxy-2-naphthoic acid; lower temperature mesophases of cholesteryl octanoate, cholesteryl nonanoate, and other open-chain aliphatic esters of cholesterol with chain length of 7 or greater; cholesteryl oleate; sitosteryl oleate; cholesteryl decanoate; cholesteryl laurate, cholesteryl myristate; cholesteryl palmitate; cholesteryl stearate; 4'-n-alkoxy-3'-nitrobiphenyl-4-carboxylic acids ethyl-p-azoxy-cinnamate; ethyl-p-4-ethoxybenzylidene-aminocinnamate; ethyl-p-azoxybenzoate; potassium oleate; ammonium oleate; p-n-octyloxy-benzoic acid; the low temperature mesophase of 2-p-n-alkoxy-benzlideneaminofluorenones with chain length of 7 or greater; the low temperature mesophase of p-(n-heptyl) oxybenzoic acid; anhydrous sodium stearate; thallium (I) stearate; mixtures thereof and others.

Mixtures of liquid crystals can be prepared in organic solvents such as chloroform, petroleum, ether and others, which are typically evaporated from the mixture thus leaving the liquid crystal composition. Alternatively, the individual components of the liquid crystalline mixture can be combined directly by heating the mixed components above the isotropic transition temperatures.

The above lists of suitable liquid crystalline imaging materials are intended to encompass mixtures of any of the above. The list is representative of suitable materials, and is in no way intended to be exhaustive or limiting. Although any liquid crystalline composition having cholesteric liquid crystalline characteristics is suitable for use in the present invention, it should be recognized that various different cholesteric liquid crystal substances or mixtures thereof or combinations of cholesteric liquid crystal substances with other substances such as nematic liquid crystals will typically possess the desired properties which make them suitable for use according to the invention in some specific temperature range which may be at room temperature or substantially above or below room temperature. However, all of the various substances, mixtures or combinations thereof will function according to the method of the invention at some temperature. Typically, the light modulation system will be used at or near room temperature. Generally speaking, the liquid crystal substance will preferably have a liquid crystal state at the desired operational temperature. It is further preferred to utilize a liquid crystal substance which has a $\lambda_o$ in the visible region of the light spectrum since this would allow the transmitted light to be viewed by the human eye. Of course, liquid crystal films having $\lambda_o$ values in the ultraviolet or infrared regions of the electromagnetic spectrum may be employed. Liquid crystal substances are known or compositions thereof may be prepared having $\lambda_o$ values of from about 2700 A. to about 10 microns. Where the $\lambda_o$ value of the liquid crystal film is not in the visible region an appropriate means for analyzing the transmitted light typically will have to be utilized.

For optimum results the liquid crystal films employed in the light modulation system of the invention will preferably have a thickness of up to about 50 microns. The rotation imparted to the incident linearly polarized light is a linear function of the liquid crystal film thickness. As the film thicknesses become relatively larger, e.g. above about 50 microns, there is a gradual deterioration in the quality of the emergent light, i.e., the light tends to depolarize so that other than completely linearly polarized light is included, and the system suffers a corresponding loss in sharpness. Liquid crystal film 12 is typically tacky, soft, viscous, glassy or liquid and therefore is preferably surrounded by a protective material 14, as is illustrated, to protect the liquid crystalline substance from foreign matter such as dust, insects or the like. The purpose of protective material 14 is to keep the liquid crystal film 12 contained and free of contamination. Thus the protective material may be any suitable material which is optically isotropic and transparent to the incident light and which is non-reactive with the liquid crystalline substance. Typical suitable materials for this purpose include glass, fused silica and any other materials having the desired characteristics.

As has been discussed previously, the incident light should be substantially completely linearly polarized monochromatic light. Any light source capable of providing linearly polarized monochromatic light, either intrinsically or in combination with other elements, is suitable for use according to the invention. Typical suitable light sources include various lasers which intrinsically emit substantially completely linearly polarized monochromatic light; those which emit essentially linearly polarized monochromatic light combined with some randomly polarized (or unpolarized) light such as light emitting diodes and which should be used in combination with some means for removing all but linearly polarized light with a preferred direction such as a linear polarizer; and broad band sources such as incandescent light sources which are employed in combination with one or more filters and a linear analyzer. It is preferred to use a laser as the light source 10 because of the simplicity of the element and the quality of the light which it provides.

Linearly polarized light analyzing element 16 may be any suitable material or device having the required characteristics necessary to accomplish the intended purpose of the element. Typical suitable materials include linear analyzers such as Polaroid Sheet commercially available from Polaroid Corp., Glan-Thompson polarizers, Nicol prisms and the like. Linear analyzers are preferred because of their relative simplicity and relatively low cost.

Figure 2:
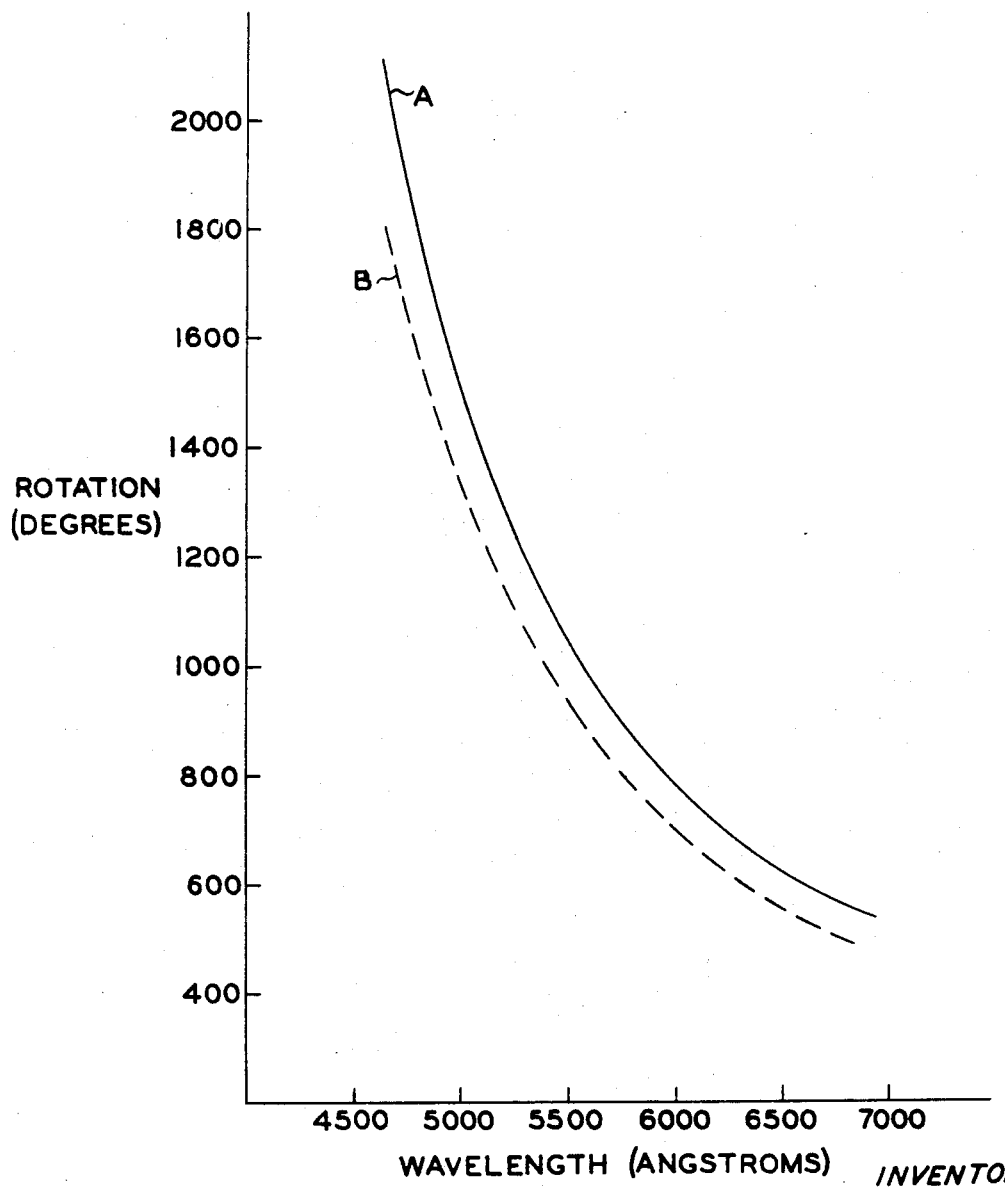
FIG. 2 is a graphical illustration showing the rotation imparted to incident monochromatic light by a cholesteric liquid crystal film at two different $\lambda_o$ values of the film.

It has been shown previously in the art that the optical activity characteristics of a cholesteric liquid crystal film change as the $\lambda_o$ value of the film changes. This phenomenon is graphically illustrated in FIG. 2. Referring now to FIG. 2 there is shown the optical activity exhibited by a thin film of a mixture of 5 percent by weight cholesteryl benzoate and 95 percent by weight p-azoxyphenetole deposited on a glass substrate. At 125°C, when the film has a $\lambda_o$ value of 9.6 $\mu$ it exhibits the optical activity described by the solid line, Curve A. When the $\lambda_o$ value of the film is shifted to 8.6$\mu$ the film exhibits the optical activity described by the broken line, Curve B. this data is disclosed by R. Cano, Bull. Soc. Fr. Mineral. Cristallogr., XC, 333 (1967). Of course, the particular composition utilized to illustrate this phenomenon is intended to be for the purposes of illustration only.

Figure 3:
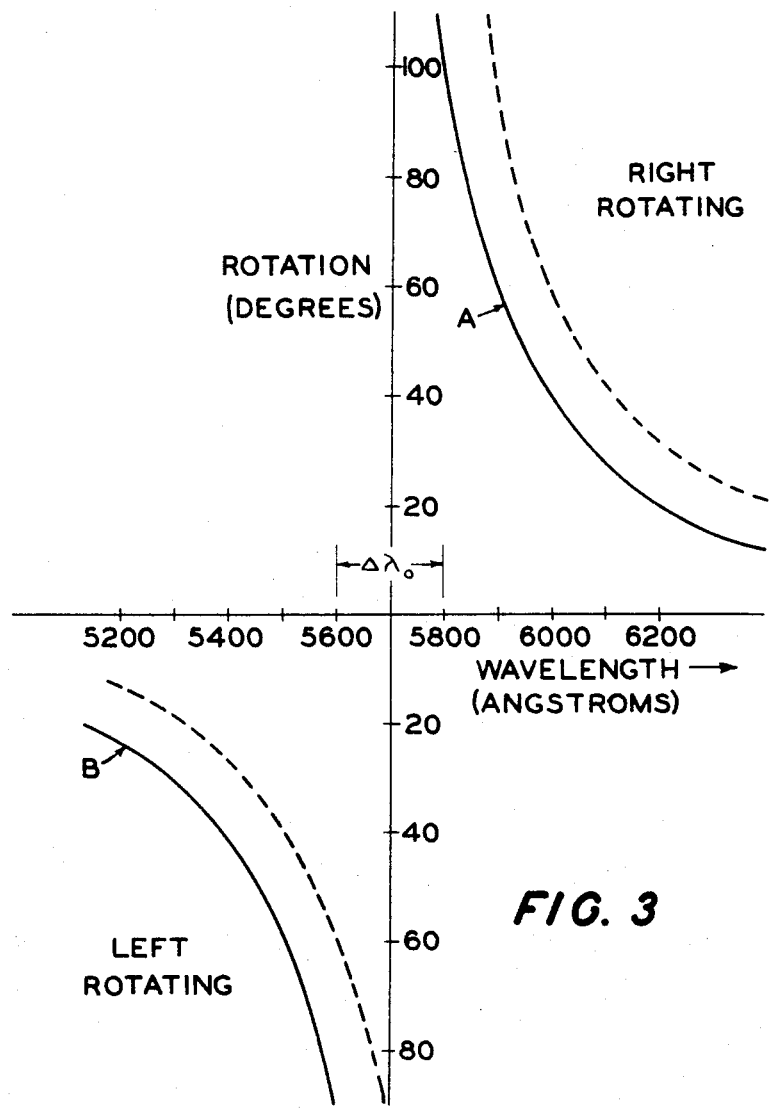
FIG. 3 is a graphical illustration showing the rotation imparted to an incident monochromatic light beam as a function of the $\lambda_o$ value of an optically negative liquid crystal film.

FIG. 3 is a graphical representation showing in detail the proposed mechanism by which the light modulation system of the invention operates. The light modulation system has been found to be operative through experimentation and thus there is no intention to limit the invention to the proposed theoretical mechanism; it is given for the purpose of providing a more complete understanding of the invention. Referring now to FIG. 3 there is illustrated the optical activity of a cholesteric liquid crystalline film comprised of about 30% by weight cholesteryl chloride and about 70 percent by weight cholesteryl nonanoate and having a $\lambda_o$ value of about 5700 A. The plot shows the optical rotation in degrees (referred to hereinafter as $\theta$) imparted to incident linearly polarized monochromatic light of various wavelengths by the liquid crystal film. Of course it will be clearly understood that this particular film composition is intended to be representative only and is used for purposes of illustration; a similar plot for any of the materials stated above as being suitable for use according to the invention could be shown in place thereof.

Solid lines A and B represent the rotation imparted to the incident light by the liquid crystal film when the liquid crystalline composition has its intrinsic $\lambda_o$ value, in this instance about 5700 A. It will be clearly seen that the optical activity of the liquid crystalline composition changes sign at the wavelength region around $\lambda_o$, designated herein as $\Delta \lambda_o$. Curve A represents wavelengths of linearly polarized monochromatic light which are rotated to the right by the film whereas Curve B shows those which are rotated to the left. In the wavelength region designated as $\Delta\lambda_o$ ($\Delta\lambda_o$ is typically in the order of $\lambda_o$)/(10–30) the incident light is not rotated by the liquid crystal film but rather approximately 50 percent is reflected and 50 percent is transmitted, (linearly polarized light containing equal amounts of right-and left hand circularly polarized light) depending upon the intrinsic rotary sense of the helical structure of the liquid crystalline composition. It will be understood by those skilled in the art that a right-handed liquid crystalline composition reflects right-hand circularly polarized light (RHCPL) substantially completely and transmits left-hand circularly polarized light (LHCPL) essentially completely, there being only negligible loss due to absorption; and the reverse is true for a left-handed composition.

Therefore for optimum performance of the novel light modulation system the incident light, $\lambda$ should be less than $\lambda_o - \alpha \Delta \lambda_o$ and more than $\lambda_o + 2 \Delta\lambda_o$.

Thus it can be seen that for incident linearly polarized light having a wavelength of 6200 A., $\theta$ is about 20° rotation to the right. Consider now what occurs when the $\lambda_o$ value of the liquid crystalline composition is changed in response to some external stimulus applied thereto. For purposes of illustration it will be assumed that there occurs a 100 A. shift toward the red region of the visible spectrum in the $\lambda_o$ value of the composition, the new value, $\lambda_F$, being about 5800 A. It is theorized that when such a shift in $\lambda_o$ takes place the optical activity of the liquid crystal film, represented initially by solid lines A and B, also shifts by the same magnitude in a corresponding direction. Thus the optical activity of the liquid crystal film when $\lambda_F = 2\ np_2$ (where $p_2$ is the pitch of the composition after the external stimulus has been applied thereto) is shown by broken lines C and D. It can be clearly seen that the $\theta$ value obtained for an incident wavelength of 6200 A is now about 28°. Therefore it will be appreciated that when a linear analyzer element is arranged behind the liquid crystal film and its axis of polarization is adjusted so that the incident light is extinguished when $\lambda_o$ for the liquid crystalline composition is equal to $2\ np$ (where $p$ is the pitch of the composition before any external stimulus is applied thereto) some light will then be seen when an external stimulus acts upon the composition and causes a change in its pitch. Details relating to the preparation of Curves A and B are given in Example I.

Figure 4:
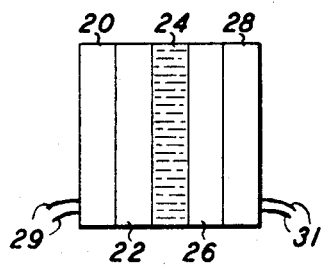
FIG. 4 is a schematic side cross-sectional view of a typical apparatus suitable for use according to a preferred embodiment of the invention.

FIG. 4 illustrates a preferred embodiment of the light modulation system of the invention wherein it is utilized to provide a temperature detection device. In certain liquid crystalline materials the pitch is extremely temperature sensitive. Therefore the amount of rotation imparted to linearly polarized light by relatively thin films comprised of such materials is a delicate function of film temperature. Thus extremely sensitive temperature detection devices can be provided according to the invention. Referring now to FIG. 4 there is shown a temperature detection apparatus comprising a light source 20, optional linear polarizer element 22, optically negative liquid crystalline film 24, linear analyzer element 26 and optional light energy analyzing element 28. Light source 20 is connected to a potential source (not shown) by means of wires 29. The device is connected to a voltage measuring device (not shown) such as a voltmeter or potentiometer by means of wires 31.

As has been discussed previously light source 20 can be any of many suitable devices capable of providing substantially completely linearly polarized monochromatic light either intrinsically or in combination with other elements such as optical filters and/or linear polarizers. As illustrated light source 20 is a monochromator such as are available from Bausch & Lomb. Optical linear polarizer element 22 is employed in conjunction with the monochromator to remove substantially all but linearly polarized light with a preferred direction. Of course, if a laser which intrinsically emits substantially completely linearly polarized monochromatic light is employed as light source 20 optional linear polarizer element 22 is not necessary. The optically negative liquid crystalline materials used to form liquid crystal film 24 are preferably those which have a large sensitivity to temperature since a relatively small temperature change will produce a relatively large change in the amount of rotation imparted to the incident light.

For maximum sensitivity, according to this embodiment, linear analyzer element 26 should be positioned at an angle of 45° to the plane of polarization of the light after it emerges from the liquid crystal film. It will be recognized by those skilled in the art that maximum sensitivity is attained in this fashion because the transmission amplitude of the transmitted light is given by the expression $I = I_o \cos^2 \theta$ where $I_o$ equals the intensity of the incident light beam and $\theta$, as has been previously discussed, is the angle through which the incident light beam is rotated by the liquid crystal film. By differentiating the above equation it is seen that the maximum change in transmission amplitude for a given change in angle is given by the expression $dI = I_o\, 2 \cos \theta \sin d\theta$, which has its maximum value when $\theta$ equals 45°. Of course whether such an arrangement of the elements would be desirable would be dependent upon whether the device is being observed by eye or by some other means.

Optional light analyzing element 28 can be any suitable element which is capable of converting the light energy which enters to electrical energy output so that the light energy input may be determined by measuring the electrical energy output. Typical suitable elements include photomultipliers, solid state diodes, photovoltaic cells or the like. As illustrated, light energy analyzing member 28 is a photovoltaic cell, and according to this embodiment of the invention the D.C. voltage output of the photovoltaic cell is a measure of temperature.

In actual practice such a temperature detection device could be very small and extremely thin, i.e., of the order of a few millimeters in thickness, and could be completely encapsulated by suitable protective material. Thus according to the invention a very practical and extremely sensitive device could be provided at relatively low cost.

Figure 5:
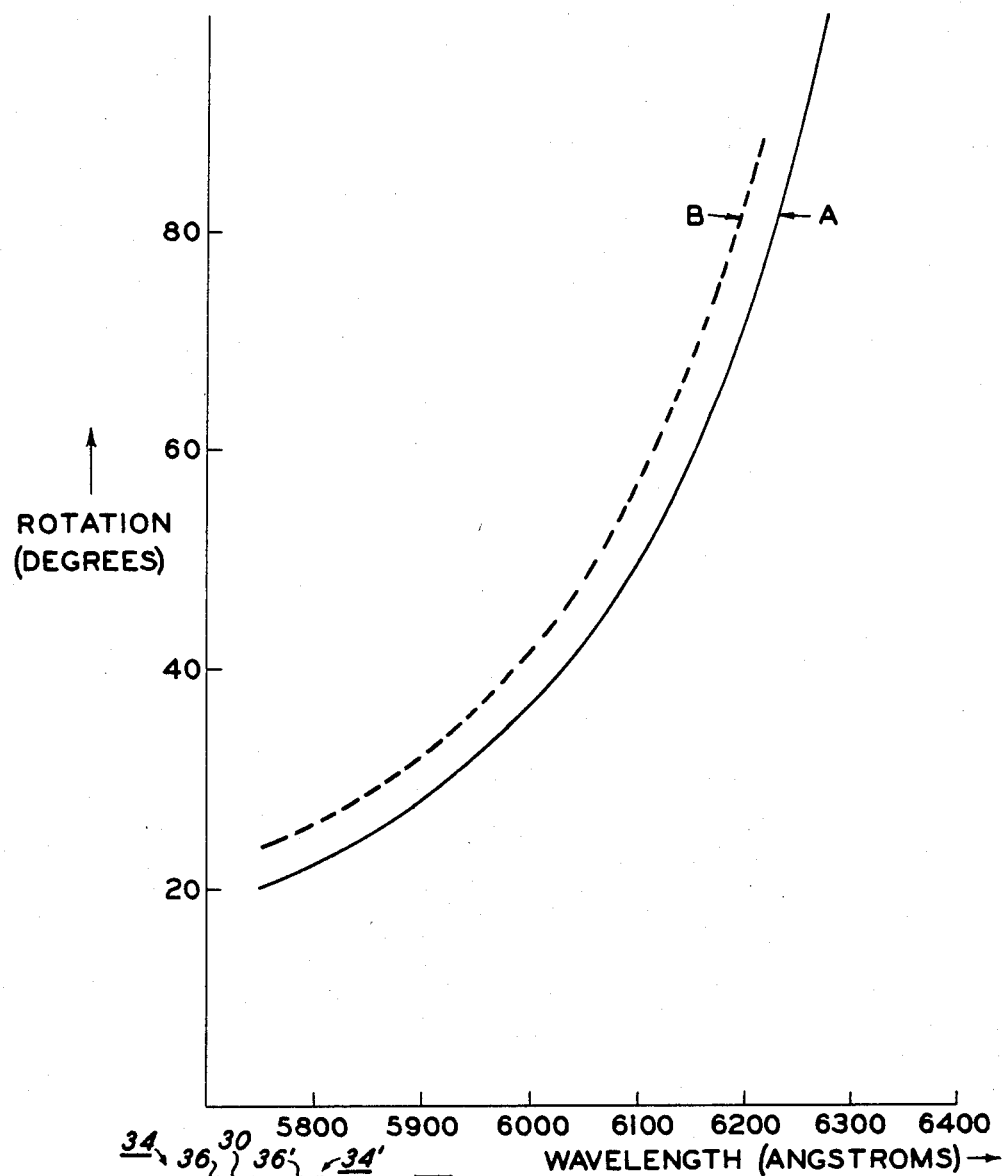
FIG. 5 is a graphical illustration indicating the change in rotation imparted to an incident light beam by an optically negative liquid crystalline film as a function of $\lambda_o$ of the film for a given change in the temperature of the film.

FIG. 5 illustrates, in principle, the extreme sensitivity of this novel temperature detection system. FIG. 5 shows a plot of optical activity versus wavelength for the same cholesteric liquid crystalline material, in this case a mixture of about 80 percent by weight cholesteryl nonanoate and about 20 percent by weight cholesteryl isobutyrate, at two different temperatures. The data is disclosed by J.L. Fergason, Mol. Cryst. 1, 309 (1966). A temperature difference of 4/100 of a degree centigrade is chosen for comparison and the liquid crystal color-temperature sensitivity is given by the expression $d\lambda_o/dt = 1000$ A./°C.

Curve A shows the optical activity of a thin film of the material deposited on a glass substrate at a temperature which is about 66°C in this illustrative instance. It is known that this curve corresponds to the formula $$\theta = (n \pi \alpha^2 \lambda_o^3)/[2 \lambda (\lambda_o^2 - \lambda_o^2)]$$

which is described by Hl de Vries in Acta Crist. Vol. 4, 219 (1951). $\theta$ is rotation in degrees per unit thickness of the liquid crystal film; $\lambda$ is the index of refraction anisotropy and is equal to $(n_o - n_E)/n$ where n is the average of $n_0$ and $n_E$; $\lambda$ and $\lambda_o$ have been previously identified.

It is clearly seen from FIG. 5 that the effect obtained from raising the temperature of the liquid crystal film by 4/100°C. is to rotate the plane of polarization of the incident light by about 10°. Since modern detecting techniques known to those skilled in the art comfortably allow the observation of a 0.015° rotation of the plane of polarization of a light beam it follows that, in principle, a temperature change of $6 \times 10^{-5}$ C can be detected according to the novel system of the invention.

While it is apparent that such a minute change in temperature will not be susceptible of being detected in actual practice because of ambient temperature fluctuations, the foregoing does nevertheless vividly illustrate the extreme sensitivity which the present system is capable of providing.

Additionally, Applicants are aware that, according to the current state of the art, the equation set forth above is not considered to be completely accurate in all situations but rather may be subject to some small corrections in some instances. However it is thought to be appropriate for the purpose of illustrating the advantageous characteristics of the system of the invention and is discussed herein only for that purpose. The system of the invention has been proved to be operative through experimentation and therefore it should be understood that there is no intention to limit the invention by the use of the equation.

Figure 6:
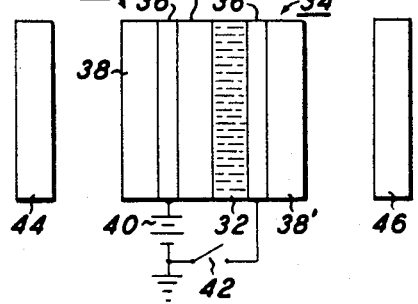
FIG. 6 is a schematic side cross-sectional view of an embodiment wherein the light modulation system of the invention is utilized in an imaging mode.

The light modulation system of the invention can also be adapted to function in an imaging mode. According to this mode of the invention a visible image may be obtained by varying the pitch of an optically negative liquid crystal film. FIG. 6 illustrates a typical device which is suitable for the practice of the invention according to the imaging mode thereof. The spatial arrangement of the elements of the device is for the purpose of illustration.

Referring now to FIG. 6 there is seen a photoconductive insulating layer 30, which may be any suitable photoconductive insulating material which is transparent to incident electromagnetic radiation, and an optically negative liquid crystal film 32 arranged between transparent electrodes 34 and 34' which in this illustrative instance comprise a thin optically transparent conducting layer of tin oxide 36 and 36' respectively coated on a layer of optically transparent glass 38 and 38' respectively. Tin oxide coated glass of this nature is commercially available under the name NESA glass from Pittsburgh Plate Glass Company. The conducting surface 36 of electrode 34 is connected to one side of potential source 40. The conducting surface 36' of electrode 34' is connected to the other side of potential source 40 through switch 42 so that when switch 42 is closed an electric field is applied across the photoconductive insulating layer 30 and liquid crystal film 32 through electrodes 34 and 34'. The outer elements of the device are optional linear polarizer element 44 and linear analyzer element 46.

Switch 42 is closed thus causing a uniform electric field to be applied across photoconductive insulating layer 30 and liquid crystal film 32. The device is then exposed to flood illumination with essentially monochromatic light of wavelengths to which the photoconductive insulating material is not sensitive and the linear analyzer element is positioned in a manner such that the incident light is extinguished. Subsequently activating electromagnetic radiation, i.e., that to which the photoconductive insulating material is sensitive, is directed upon the device in imagewise fashion thereby forming an electrostatic latent image on the photoconductive insulating layer. The formation of the electrostatic latent image on the photoconductive insulating layer 30 causes the electric field across liquid crystal film 32 to be varied in image configuration with a resultant change in the pitch of the liquid crystal film in the areas thereof corresponding to the areas of the photoconductive insulating layer struck by activating radiation. Thus the plane of polarization of the incident monochromatic light is rotated through a different angle by the image areas of the liquid crystal film and the image is read out of the device.

It will be understood that optional linear polarizer element 44 is required if the incident monochromatic light is not substantially completely linearly polarized. Of course, if the incident monochromatic light is of such a nature then linear polarizer element is not necessary for the practice of the method. Any suitable photoconductive insulating material which is optically transparent to the incident monochromatic light may be utilized for photoconductive insulating layer 30.

According to another embodiment of the imaging mode of the invention the electrodes may be provided in imagewise configuration in which case the photoconductive insulating layer is not necessary. According to this embodiment linearly polarized monochromatic light is directed upon the device while an electric field is placed across the liquid crystal film through the imagewise-shaped electrodes. A visible image is thus read out of the device.

The invention will now be further described with respect to specific preferred embodiments by way of Examples, to better aid those skilled in the art to practice the invention it being understood that these are intended to be illustrative only and the invention is not limited to the materials, conditions, procedures, etc., recited therein. All parts and percentages listed in the Examples are by weight unless otherwise specified.

EXAMPLE I

A mixture of about 30 percent cholesteryl chloride and about 70 percent cholesteryl nonanoate is prepared having a $\lambda_o$ value of about 5700 A. at 23°C. An approximately 5–10 $\mu$ thick film of the mixture is applied to the surface of a glass slide and another glass slide is then placed over the free surface of the liquid crystal film.

The liquid crystal film is placed in a polarizing microscope and the optical rotation measured for various wavelengths of linearly polarized monochromatic light.

EXAMPLE II

An optically negative liquid crystalline composition is prepared by mixing together about 35% cholesteryl chloride and about 65 percent cholesteryl nonanoate. The composition has a $\lambda_o$ value of about 5900 A. An approximately 5–10 $\mu$ thick film of the composition is placed on a glass slide and another glass slide is placed over the free surface of the liquid crystal film. The liquid crystal film is then placed in the path of a linearly polarized light beam having a wavelength of about 4500 A. provided by a suitable laser. A linear analyzer element is placed behind the liquid crystal film and rotated to a position where the incident light beam is completely extinguished. The liquid crystal film is heated slightly with a heat gun and light is observed passing through the linear analyzer element.

EXAMPLE III

The composition described in Example II is placed between two transparent NESA glass electrodes. This combination is placed between a linear polarizer element and a linear analyzer element. Incident monochromatic light is directed upon the device and the angle between the respective axes of polarization of the linear polarizer and linear analyzer is adjusted so as to extinguish the incident light. A voltage of about $10^5$ volts/cm is then impressed across the liquid crystal film and the resultant change in pitch of the liquid crystalline material permits light to pass through the device.

EXAMPLE IV

A layer of the composition described in Example II is applied to the conducting surface of a NESA glass electrode. An approximately 1 mil thick Mylar film spacer is placed over the free surface of the liquid crystal film and a thin layer of photoconductive zinc sulfide is disposed on the free surface of the Mylar film. Subsequently a second NESA glass electrode is arranged over the zinc sulfide layer with the conducting surface of the NESA glass contacting the zinc sulfide layer. This combination is placed between a linear polarizer and a linear analyzer.

A uniform electric field is impressed across the zinc sulfide layer and liquid crystal film by applying voltage from a power source through the NESA glass electrodes. The device is flood illuminated with monochromatic light having a wavelength of about 6500 A and the angle between the respective axes of polarization of the linear polarizer and linear analyzer is adjusted so as to extinguish the incident light. Ultraviolet activating radiation is then directed upon the device in imagewise fashion and a visible image is read out of the device.

While the invention has been described in detail with respect to certain embodiments thereof it is not intended to be limited thereto but rather it will be appreciated by those skilled in the art that modifications and variations are possible which are within the spirit of the invention and the scope of the claims.

What is claimed is:

1. A method for modulating a light beam comprising the steps of:
   a. providing an optical device comprising a film of optically negative liquid crystalline material and a linear analyzer element, said liquid crystalline material having a light reflection band with center wavelength $\lambda_o$ and bandwidth $\Delta\lambda_o$;
   b. directing a substantially completely linearly polarized beam of monochromatic light upon said optical device, said monochromatic light being in a region outside of $\lambda_o \pm 2 \Delta \lambda_o$; and
   c. applying to said liquid crystalline material a stimulus which is capable of changing the light reflection band of said material to a second position, wherein said light reflection band in said second position has a center wavelength $\lambda_F$ and a bandwidth $\Delta\lambda_F$ and wherein said monochromatic light is in a region outside of $\lambda_F \pm 2 \Delta\lambda_F$,
   whereby said monochromatic light beam is modulated.

2. The method as defined in claim 1 wherein said liquid crystalline film is from about 0.5 to about 10 $\mu$ in thickness.

3. The method as defined in claim 1 wherein the axis of polarization of said linear analyzer element is positioned so that said monochromatic light is initially substantially completely extinguished.

4. The method as defined in claim 1 wherein said stimulus applied to said liquid crystalline material is heat.

5. The method as defined in claim 1 wherein said stimulus applied to said liquid crystalline material is an electric field.

6. The method as defined in claim 1 wherein said stimulus applied to said liquid crystalline material is a shearing force.

7. The method as defined in claim 1 wherein said stimulus applied to said liquid crystalline material is a magnetic field.

8. The method as defined in claim 1 wherein said stimulus applied to said liquid crystalline material comprises x-rays.

9. The method as defined in claim 1 wherein said liquid crystalline material is selected from the group consisting of: cholesteric liquid crystalline substances; mixtures of cholesteric liquid crystalline substances and nematic liquid crystalline substances; mixtures of cholesteric liquid crystalline substances and smectic liquid crystalline substances; mixtures of cholesteric liquid crystalline substances and non-liquid crystalline substances which are compatible with cholesteric liquid crystalline substances; and mixtures thereof.

10. A method of detecting a change in ambient temperature comprising the steps of:
    a. providing an optical device comprising arranged in tandem, a film of an optically negative liquid crystalline material, a linear analyzer element and a light energy analyzing element, said liquid crystalline material having a light reflection band with center wavelength $\lambda_o$ and bandwidth $\Delta\lambda_o$ and wherein a change in ambient temperature is capable of changing the light reflection band of said material to another position, said light reflection band in said other position having a center wavelength $\lambda_F$ and a bandwidth $\Delta\lambda_F$;
    b. directing a substantially completely linearly polarized beam of monochromatic light upon said optical device, said monochromatic light being in a region outside of $\lambda_o \pm 2 \Delta\lambda_o$ and $\lambda_F \pm 2 \Delta\lambda_F$, wherein the energy of the light transmitted by said linear analyzer element is a function of the ambient temperature; and
    c. observing changes in the light energy transmitted by said linear analyzer element corresponding to changes in the ambient temperature.

11. The method as defined in claim 10 wherein said liquid crystalline film is from about 0.5 to about 10 $\mu$ in thickness.

12. The method as defined in claim 10 wherein the axis of polarization of said linear analyzer element is positioned so that said monochromatic light is initially substantially completely extinguished at some desired temperature.

13. The method as defined in claim 10 wherein said liquid crystalline film comprises a material selected from the group consisting of: cholesteric liquid crystalline substances; mixtures of cholesteric liquid crystalline substances and nematic liquid crystalline substances; mixtures of cholesteric liquid crystalline substances and smectic liquid crystalline substances; mixtures of cholesteric liquid crystalline substances and non-liquid crystalline substances which are compatible with cholesteric liquid crystalline substances; and mixtures thereof.

14. The method as defined in claim 10 wherein said substantially completely linearly polarized beam of monochromatic light is provided by a laser.

15. An imaging method comprising the steps of:
    a. providing an imaging device comprising in combination, a film of an optically negative liquid crystalline material arranged between two substantially transparent shaped electrodes and a linear analyzer element arranged behind said combination, said liquid crystalline material having a light reflection band with center wavelength $\lambda_o$ and bandwidth $\Delta\lambda_o$, wherein an electric field is capable of changing the light reflection band of said material to another position, said light reflection band in said other position having a center wavelength $\lambda_F$ and bandwidth $\Delta\lambda_F$;

b. directing substantially completely linearly polarized monochromatic light on said imaging device, said monochromatic light being in a region outside of $\lambda_o \pm 2 \Delta\lambda_o$ and $\lambda_F \pm 2 \Delta\lambda_F$ wherein said linear analyzer element is positioned so as to completely extinguish said monochromatic light; and c. applying a shaped electric field across said liquid crystal film between said shaped electrodes, said electric field being of sufficient strength to change the light reflection band of said liquid crystal film in the field-affected areas of said film to another position, said light reflection band in said other position having a center wavelength $\lambda_F$ and bandwidth $\Delta\lambda_F$, whereby a visible image is transmitted through the imaging device.

16. The imaging method as defined in claim 15 wherein said liquid crystalline film is from about 0.5 to about 10 $\mu$ in thickness.

17. An imaging method comprising the steps of a. providing an imaging device comprising in combination, a film of an optically negative liquid crystalline material and an optically transparent layer of photoconductive insulating material arranged between two substantially transparent electrodes and a linear analyzer element arranged behind said combination, said liquid crystalline material having a light reflection band with center wavelength $\lambda_o$ and bandwidth $\Delta\lambda_o$, wherein an electric field is capable of changing the light reflection band of said material to another position, said light reflection band in said other position having a center wavelength $\lambda_F$ and a bandwidth $\Delta\lambda_F$;

b. applying a uniform electric field across said photoconductive insulating layer and said liquid crystal film between said transparent electrodes;

c. directing substantially completely linearly polarized monochromatic light on said imaging device with said linear analyzer element being positioned so as to completely extinguish said monochromatic light, said monochromatic light being in a region outside of $\lambda_o \pm 2 \Delta \lambda_o$ and $\lambda_F \pm 2 \Delta\lambda_F$ and wherein said photoconductive insulating material is substantially non-photosensitive to said monochromatic light; and d. directing imagewise activating electromagnetic radiation to which said photoconductive insulating material is substantially photosensitive upon said imaging device to cause the electric field across the liquid crystal film to be varied in imagewise configuration, wherein the electric field across said liquid crystal film in areas struck by said activating electromagnetic radiation is of sufficient strength to change the reflection band of said liquid crystalline material in said areas to another position, said light reflection band in said other position having a center wavelength $\lambda_F$ and bandwidth $\Delta\lambda_F$, whereby a visible image is transmitted by said imaging device.

18. The imaging method as defined in claim 17 wherein said liquid crystalline film is from about 0.5 to about 50 $\mu$ in thickness.

* * * * *